(12) United States Patent
Chun et al.

(10) Patent No.: US 8,040,806 B2
(45) Date of Patent: Oct. 18, 2011

(54) METHODS OF GENERATING DATA BLOCK IN MOBILE COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 8 days.

(21) Appl. No.: 12/451,181

(22) PCT Filed: Apr. 30, 2008

(86) PCT No.: PCT/KR2008/002469
§ 371 (c)(1),
(2), (4) Date: Oct. 29, 2009

(87) PCT Pub. No.: WO2008/133485
PCT Pub. Date: Nov. 6, 2008

(65) Prior Publication Data
US 2010/0124237 A1    May 20, 2010

Related U.S. Application Data

(60) Provisional application No. 60/915,042, filed on Apr. 30, 2007, provisional application No. 60/974,072, filed on Sep. 20, 2007.

(30) Foreign Application Priority Data
Apr. 30, 2008  (KR) .................. 10-2008-0040507

(51) Int. Cl.
*G01R 31/08* (2006.01)

(52) U.S. Cl. .............. 370/235; 370/469; 370/474
(58) Field of Classification Search ............ 370/465, 370/466, 467, 527, 536, 395, 335, 235–238, 370/469–473, 474
See application file for complete search history.

(56) References Cited

U.S. PATENT DOCUMENTS
6,157,833 A    12/2000  Lawson-Jenkins et al.
(Continued)

FOREIGN PATENT DOCUMENTS
EP    1 148 753    10/2001
(Continued)

OTHER PUBLICATIONS
Sammour et al., U.S. Appl. No. 60/863,185.
(Continued)

*Primary Examiner* — Pao Sinkantarakorn
*Assistant Examiner* — Iqbal Zaidi
(74) *Attorney, Agent, or Firm* — McKenna Long & Aldridge LLP

(57) ABSTRACT

Disclosed is a method for generating a lower layer data block to be transmitted from a specific layer in a transmitting side to a receiving side in a mobile communication system. The method includes receiving an upper layer data block from an upper layer and generating a lower layer data block including at least part of the upper layer data block and a buffer status indicator indicating a status change of a data buffer associated with a group identifier corresponding to the upper layer data block. According to this data block generation method, states of buffers carrying upper layer data blocks are transmitted to a base station using minimum radio resources, thereby increasing system efficiency.

3 Claims, 4 Drawing Sheets

U.S. PATENT DOCUMENTS

| | | | |
|---|---|---|---|
| 6,324,171 | B1 | 11/2001 | Lee et al. |
| 6,353,628 | B1 | 3/2002 | Wallace et al. |
| 6,526,027 | B1 | 2/2003 | Yeom |
| 6,567,409 | B1 * | 5/2003 | Tozaki et al. ............ 370/395.64 |
| 6,725,267 | B1 | 4/2004 | Hoang |
| 7,197,317 | B2 | 3/2007 | Parkvall et al. |
| 7,245,707 | B1 | 7/2007 | Chan |
| 7,551,643 | B2 | 6/2009 | Yeo et al. |
| 2001/0017850 | A1 | 8/2001 | Kalliokulju et al. |
| 2001/0044322 | A1 | 11/2001 | Raaf |
| 2002/0024972 | A1 | 2/2002 | Yi et al. |
| 2002/0028690 | A1 | 3/2002 | McKenna et al. |
| 2002/0057663 | A1 | 5/2002 | Lim |
| 2003/0007512 | A1 | 1/2003 | Tourunen et al. |
| 2003/0123485 | A1 | 7/2003 | Yi et al. |
| 2003/0165133 | A1 | 9/2003 | Garani |
| 2003/0189922 | A1 | 10/2003 | Howe |
| 2003/0207696 | A1 | 11/2003 | Willenegger et al. |
| 2004/0014452 | A1 | 1/2004 | Lim et al. |
| 2004/0028078 | A1 | 2/2004 | Beckmann et al. |
| 2004/0117860 | A1 | 6/2004 | Yi et al. |
| 2004/0121771 | A1 | 6/2004 | Song et al. |
| 2004/0253959 | A1 | 12/2004 | Hwang et al. |
| 2005/0041610 | A1 | 2/2005 | Lee et al. |
| 2005/0041681 | A1 | 2/2005 | Lee et al. |
| 2005/0085254 | A1 | 4/2005 | Chuah et al. |
| 2005/0094670 | A1 | 5/2005 | Kim |
| 2005/0141462 | A1 * | 6/2005 | Aerrabotu et al. ............ 370/335 |
| 2005/0176474 | A1 | 8/2005 | Lee et al. |
| 2005/0185620 | A1 | 8/2005 | Lee et al. |
| 2005/0232271 | A1 | 10/2005 | Kimmo et al. |
| 2005/0238051 | A1 | 10/2005 | Yi et al. |
| 2006/0067324 | A1 | 3/2006 | Kim et al. |
| 2006/0067364 | A1 * | 3/2006 | Jung et al. ..................... 370/469 |
| 2006/0087994 | A1 | 4/2006 | Barth et al. |
| 2006/0126554 | A1 | 6/2006 | Motegi et al. |
| 2006/0165045 | A1 | 7/2006 | Kim et al. |
| 2006/0209870 | A1 | 9/2006 | Lee et al. |
| 2006/0245417 | A1 | 11/2006 | Conner et al. |
| 2007/0047582 | A1 | 3/2007 | Malkamaki |
| 2007/0060139 | A1 | 3/2007 | Kim et al. |
| 2007/0165567 | A1 | 7/2007 | Tan et al. |
| 2007/0177569 | A1 | 8/2007 | Lundby |
| 2007/0178875 | A1 | 8/2007 | Rao et al. |
| 2007/0206531 | A1 | 9/2007 | Pajukoski et al. |
| 2007/0248075 | A1 | 10/2007 | Liu et al. |
| 2007/0258591 | A1 | 11/2007 | Terry et al. |
| 2007/0291673 | A1 | 12/2007 | Demirhan et al. |
| 2007/0291719 | A1 | 12/2007 | Demirhan et al. |
| 2007/0291728 | A1 | 12/2007 | Dalsgaard et al. |
| 2007/0291729 | A1 | 12/2007 | Dalsgaard et al. |
| 2008/0043619 | A1 | 2/2008 | Sammour et al. |
| 2008/0056198 | A1 | 3/2008 | Charpentier et al. |
| 2008/0056273 | A1 | 3/2008 | Pelletier et al. |
| 2008/0101268 | A1 | 5/2008 | Sammour et al. |
| 2008/0167089 | A1 | 7/2008 | Suzuki et al. |
| 2008/0181127 | A1 | 7/2008 | Terry et al. |
| 2008/0273610 | A1 | 11/2008 | Malladi et al. |

FOREIGN PATENT DOCUMENTS

| | | |
|---|---|---|
| EP | 1 168 877 | 1/2002 |
| EP | 1 209 938 | 5/2002 |
| EP | 1 304 898 | 4/2003 |
| EP | 1 315 356 | 5/2003 |
| EP | 1337124 A2 * | 8/2003 |
| EP | 1 372 310 | 12/2003 |
| EP | 1 420 551 | 5/2004 |
| EP | 1 501 328 | 1/2005 |
| EP | 1 511 245 | 3/2005 |
| EP | 1 318 632 | 6/2006 |
| EP | 1 720 373 | 11/2006 |
| EP | 1720322 A1 | 11/2006 |
| EP | 1932380 | 6/2008 |
| JP | 2002-539686 | 11/2002 |
| JP | 2003-504935 | 2/2003 |
| JP | 2005-354488 | 12/2005 |
| JP | 2006-505979 | 2/2006 |
| JP | 2006-067115 | 3/2006 |
| KR | 10-2001-0105240 | 11/2001 |
| KR | 10-2004-0039944 | 5/2004 |
| KR | 10-2004-0048675 | 6/2004 |
| KR | 10-2005-0008440 | 1/2005 |
| KR | 10-2005-0027972 | 3/2005 |
| KR | 10-2005-0096763 | 10/2005 |
| RU | 2249917 C2 | 4/2005 |
| WO | WO 00/74416 | 12/2000 |
| WO | WO 2004/043094 | 5/2004 |
| WO | WO 2004/064272 | 7/2004 |
| WO | WO 2005/048613 | 5/2005 |
| WO | WO 2006/049441 A1 | 5/2006 |
| WO | WO 2006/075820 A1 | 7/2006 |
| WO | WO 2006/104344 | 10/2006 |
| WO | WO 2006/109851 | 10/2006 |
| WO | WO 2007/025138 | 3/2007 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | WO 2007/133034 | 11/2007 |
| WO | WO 2008/111684 A1 | 9/2008 |
| WO | WO 2009/084998 | 7/2009 |

OTHER PUBLICATIONS

NTT Docomo et al: "MAC PDU structure for LTE", 3GPP TSG RAN WG2 #56bis, R2-070280, Jan. 2007, XP050133369.

Catt et al: "Enhancement to Buffer Status Reporting", 3GPP TSG-RAN WG2 #57bis, R2-071345, Mar. 2007, XP050134291.

LG Electronics Inc: "PDCP retransmissions" 3GPP Draft; R2-073041 PDCP Retransmissions_V2, Aug. 16, 2007, XP050135778.

LG Electronics Inc: "Contents of PDCP Status Report R2-07xxxx", 3GPP TSG-RAN WG2, 59, Oct. 8, 2007, pp. 1-3, XP002580785.

"PDCP Structure and Traffic Path" 3GPP Draft; R2-073259, Aug. 16, 2007, XP050135985.

Asustek: "Granularity Consideration for Variable RLC PDUsizes"; R2-070336, XP050133423, Jan. 12, 2007.

3GPP; "Technical Specification Group Radio Access Network"; Medium Access control (MAC) protocol specification (Release 7); XP050367709, Mar. 1, 2007.

Bosch: "Header Compression Signalling" 3GPP Draft; XP050114120, Nov. 29, 1999.

3GPP; "Packet Data Convergence Protocol (PDCP) Specification (Release 7)", 3GPP TS 25.323, XP050367856, Mar. 1, 2007.

Youjun Gao et al: "Research on the access network and MAC technique for beyond 3G systems" IEEE Wireless Communications, IEEE Service Center, Piscataway, NJ, US, vol. 14, No. 2, Apr. 1, 2007, pp. 57-61, XP011184637 ISSN: 1536-1284.

3GPP-RAN WG2, Meeting #56-bis, R2-070107, "Requirements for redirection in E-UTRAN", NOKIA, Jan. 2007.

IPWireless: "Layer 2 functions for LTE", 3GPP TSG RAN WG2 #48bis, R2-052377, Oct. 2005.

Samsung Electronics Co., Ltd.: "Selective forwarding/retransmission during HO", 3GPP TSG-RAN2 Meeting #56BIS, R2-070130, Jan. 2007.

Samsung Electronics Co., Ltd.: "Re-use of PDCP SN at ARQ level", 3GPP TSG-RAN2 Meeting #53bis, R2-061829, Jun. 2006.

Panasonic, "MAC PDU format for LTE", 3GPP TSG RAN WG2#56bis, R2-070096, Jan. 2007.

LG Electronics, "Relative Buffer Status Reporting", 3GPP TSG-RAN WG2 meeting #46bis, R2-050852, Apr. 2005.

Alcatel-Lucent: "Downlink Control Signaling and Multiplexing for VOIP, R1-071721", $3^{rd}$ Generation Partnership Project (3GPP) Technicalspecification Group (TSG) Radio Access Network (RAN); Workinggroup 1 (WG1), No. 48bis, Mar. 26, 2007, pp. 1-4, XP002460800.

Nokia Corporation, Nokia Siemens Networks: "MAC Header Format, R2-073891", #GPP TSG-RAN WG2 meeting 59bis, Oct. 1, 2007, XP002602993.

LG Electronics Inc.: "Support for VOIP Over MAC-hs/ehs", 3GPP Draft; R2-071542 Support for VOIP Over MAC-HS, $3^{rd}$ Generation Partnership Project (3GPP), Mobile Competence Centre; vol. RAN WG2, No. St. Julian; 20070402, Apr. 2, 2007, XP050134474.

Sammour et al., U.S. Appl. No. 60/863,185, Oct. 2006.

LG Electronics: "UL Timing Control related to Contention Resolution", 3GPP TSG-RAN WG2 #61bis, Shenzhen, China, Mar. 31-Apr. 4, 2008, R2-081607, XP050139334.

3rd Generation Partnership Project: Evolved Universal Terrestrial Radio Access (E-UTRA) Medium Access Control (MAC) protocol specification (Release 8), Technical Specification Group Radio Access Network, Mar. 1, 2008, XP050377617.

Nokia: "Active Mode DRX", 3GPP TSG-RAN WG2 Meeting #55, Seoul, Korea, Oct. 9-11, 2006, R2-062752.

NTT DoCoMo, Inc.: "Views on DRX/DTX control in LTE", 3GPP TSG RAN WG2 #56, Riga, Lativa, Nov. 6-10, 2006, R2-063397.

Email Rapporteur (Nokia): "DRX in E-UTRAN", 3GPP TSG-RAN WG2 Meeting #57, St. Louis, Missouri, Feb. 12-16, 2007, R2-070463.

* cited by examiner

METHODS OF GENERATING DATA BLOCK IN MOBILE COMMUNICATION SYSTEM

This application claims the benefit of PCT/KR2008/002469, filed on Apr. 30, 2008, along with U.S. Provisional Application Ser. No. 60/915,042, filed Apr. 30, 2007, U.S. Provisional Application Ser. No. 60/974,072, filed Sep. 20, 2007, and Korean Patent Application No. 10-2008-0040507, filed Apr. 30, 2008, each of which are hereby incorporated herein by reference for all purposes in their entireties.

TECHNICAL FIELD

The present invention relates to a communication system, and more particularly, to a method for generating data blocks in a mobile communication system.

BACKGROUND ART

FIG. 1 illustrates the structure of a wireless access protocol responsible for data transmission in a radio link of a Universal Mobile Telecommunication System (UMTS) which is a third generation mobile communication system. Data link layer corresponding to the second layer (Layer 2: L2) of the Open System Interconnection (OSI) reference model includes a Medium Access Control (MAC) layer, a Radio Link Control (RLC) layer, a Packet Data Convergence Protocol (PDCP) layer, and a Broadcast/Multicast Control (BMC) layer. The physical layer corresponds to the first layer (Layer 1: L1). Information exchange between protocol layers is performed through virtual access points that are referred to as "Service Access Points (SAPs)," which are represented by ovals in FIG. 1. Data units communicated between layers are given different names. These data units are referred to as "Service Data Units (SDUs)" and basic units that protocols use for transmitting data are referred to as "Protocol Data Units (PDUs)." In the following description of the invention, reference to data delivered between layers in the wireless access protocol structure indicates data blocks in specific units such as SDUs or PDUs as described above.

The MAC layer is a layer responsible for mapping between logical and transport channels. The MAC layer selects an appropriate transport channel for transmitting data received from the RLC layer and adds required control information to a header of a MAC PDU. Special functions performed by the MAC layer include a radio resource management function and a measurement function. The radio resource management function is not performed solely by the MAC layer. Instead, the radio resource management function serves to set operations of the MAC layer based on various MAC parameters received from a Radio Resource Control (RRC), which is located above the MAC layer, to control data transmission. Examples of the radio resource management function include a function to change mapping relations between logical and transport channels or to multiplex and transmit data through a scheduling function. The measurement function serves to measure the amount of traffic of a terminal and to report the measurement to an upper layer. The upper layer can change the configuration (or setting) of the MAC layer based on the measurement information obtained by the MAC layer of the terminal, thereby efficiently managing radio (or wireless) resources.

The RLC layer is located above the MAC layer and supports reliable data transmission. The RLC layer segments and concatenates RLC Service Data Units (SDUs) received from the above layer in order to construct data having a size suitable for a radio link.

An RLC layer at the receiving side supports data recombination in order to restore original RLC SDUs from the received RLC PDUs. Each RLC entity can operate in a Transparent Mode (TM), an Unacknowledged Mode (UM), or an Acknowledged Mode (AM) according to processing and transmission methods of RLC SDUs. When the RLC entity operates in the TM, it transfers an RLC SDU received from an upper entity or layer to the MAC layer without adding any header information to the RLC SDU. When the RLC entity operates in the UM, it segments/concatenates RLC SDUs to construct RLC PDUs and adds header information including a sequence number to each RLC PDU. However, in the UM, the RLC entity does not support data retransmission. When the RLC entity operates in the AM, it can use the RLC SDU segmentation/concatenation function to construct RLC PDUs and can perform retransmission when packet transmission has failed. Various parameters and variables such as a transmission window, a reception window, a timer, and a counter are used for the retransmission function in the AM.

The PDCP layer is used only in packet exchange regions and can compress and transmit IP packet headers so as to increase the transmission efficiency of packet data in wireless channels. The PDCP layer also manages sequence numbers in order to prevent data loss during Serving RNC (SRNC) relocation.

The BMC layer broadcasts cell broadcast messages received from a core network to multiple users through a common channel.

The physical layer, which is the first layer, provides an information transfer service to an upper layer using a physical channel. The physical layer is connected to the Media Access Control (MAC) layer located above the physical layer through a transport channel. Data is transferred between the MAC layer and the physical layer through the transport channel. Data is transferred between different physical layers (specifically, physical layers of transmitting and receiving sides) through a physical channel.

A Radio Resource Control (RRC) layer, which is located at the bottom of the third layer, is defined only in the control plane and is responsible for controlling logical, transport, and physical channels in association with configuration, re-configuration, and release of Radio Bearers (RBs). RBs are services that the second layer provides for data communication between terminals and a network including a base station. The control plane is a hierarchy in which control information is transferred in the vertical structure of the wireless access protocol of FIG. 1 and the user plane is a hierarchy in which user data/information is transferred.

As shown in FIG. 1, an RLC PDU generated in the RLC layer is transferred to the MAC layer and is handled as a MAC SDU in the MAC layer. While a MAC SDU, which is an RLC PDU received from the RLC layer, undergoes various functions of the MAC layer, various header information required for data processing is added to the MAC SDU. The header information can be altered depending on mapping relations between logical and transport channels.

Logical channels provide transport passages required for data exchange between the MAC and the RLC layer. Each logical channel is classified into control and traffic channels according to the type of data transmitted therethrough. The control channel transmits data of the control plane and the traffic channel transmits user traffic data. A logical channel is a type of data stream carrying a specific type of information. Each logical channel is generally connected to one RLC entity. One or more logical channels of the same type can also be connected to an RLC entity. Transport channels provide passages for data communication between the physical and MAC layers. A data stream in a logical channel is embodied as a MAC PDU in the MAC layer.

FIG. 2 illustrates a method in which a terminal receives data in an E-UMTS system. In a communication system employing Orthogonal Frequency Division Multiplexing (OFDM) as an example multi-carrier system, communication is performed using one or more frequency blocks that are allocated every specific time interval. More specifically, the transmitting and receiving sides mostly communicate control signals and data, except specific control signals or data, through a common physical channel such as a Physical Downlink Shared CHannel (PDSCH) that uses a common transport channel such as a Downlink Shared CHannel (PD-SCH). Here, the transmitting and receiving sides may correspond respectively to a base station and a terminal, and vice versa. In the description of the invention, the term "transmitting side" refers to a base station and the term "receiving side" refers to a terminal for ease of explanation.

To accomplish the above communication, before the receiving side receives data of a common physical channel, the receiving side needs to receive control information regarding a receiving side(s) to which the data of the common physical channel is to be transmitted and regarding how the receiving side is to receive and decode the common physical channel. In the OFDM system, a channel for control information is first allocated to a basic processing interval (for example, a subframe period in FIG. 2) in the physical layer and a channel for data is then allocated to a next time interval. A Physical Downlink Control CHannel (PDCCH) in FIG. 2 corresponds to the control information channel and a Physical Downlink Shared CHannel (PDSCH) subsequent to the PDCCH corresponds to the data channel.

For example, let us assume that the PDCCH in the first subframe in FIG. 2 is CRC-masked with terminal identification information such as a Radio Network Temporary Identify (RNTI) and is then transmitted from a base station in a specific cell while the transmitted PDCCH includes information regarding data that is being transmitted using specific transport format information (for example, information regarding a modulation and coding method and a transport block size) through a specific radio resource such as a specific carrier set. In this case, upon receiving a PDCCH, each of a plurality of terminals in the specific cell checks whether or not the received PDCCH belongs to the terminal using terminal identification information such as an RNTI that the network has allocated to the terminal. If the received PDCCH belongs to the terminal, the terminal reads the specific radio resource information and the specific transport format information included in the PDCCH and receives a PDSCH in the same subframe.

In order to transmit data to the base station, the terminal needs to be allocated a radio resource for uplink transmission. To accomplish this, the terminal needs to request that the base station allocate a radio resource for data transmission. In the OFDM system, one or more terminals can use a single radio resource. If two or more terminals simultaneously transmit signals in uplink using the same radio resource, the base station cannot analyze the signals transmitted from the terminals. Therefore, the base station needs to perform scheduling such that only one terminal is permitted to use the radio resource in one radio resource processing unit.

To perform scheduling as described above, the base station may allocate radio resources to a terminal using the following methods before or while a call is connected between the base station and the terminal.

In the first method, the base station allocates radio resources to the terminal without being aware of how much uplink data the terminal has. However, this method causes waste of resources since radio resources are allocated to the terminal even when no data is transmitted from the terminal as the terminal has no uplink data for transmission.

In the second method, the terminal transmits information regarding a buffer associated directly with the amount of uplink data to the base station to allow the base station to know how much uplink data the terminal has and the base station then allocates uplink radio resources to the terminal based on the information.

The following are the cases where the terminal needs to transmit information regarding its buffer to the base station in the second method.

The first case is where the terminal has suddenly received data from an upper layer above the terminal before the terminal has not transmitted and received any data. In this case, since the terminal needs to be allocated radio resources for initial transmission, the terminal needs to send buffer information to the base station in order to request that the base station allocate radio resources to the terminal.

The second case is where the terminal actively transmits or receives data to or from the base station. In this case, the terminal transmits information regarding the amount of data in the terminal in order to allow the base station to determine the time until which the base station has to further allocate radio resources or to determine whether the base station is to increase or decrease the amount of radio resources allocated to the terminal afterwards. If the terminal does not transmit information regarding the amount of data in this case, the base station may stop allocating radio resources to the terminal since the base station has no updated information of the buffer of the terminal even though the terminal has data for transmission or the base station may continue allocating more radio resources than necessary, thereby reducing system efficiency.

DISCLOSURE

Technical Problem

As discussed above, the terminal needs to request that the base station allocate uplink radio resources, suitable for the buffer status of the terminal, to the terminal. However, there is a need to minimize the information regarding the buffer status to increase data transmission efficiency since the information regarding the buffer status does not correspond to actual payload data to be transmitted from the terminal but is control information for aiding smooth transmission and reception of the payload data.

The present invention has been suggested to overcome the above problems in the background art, and it is an object of the present invention to provide a method for generating a data block in a mobile communication system.

Another object of the present invention is to provide a method for generating a data block including a control signal for increasing transmission efficiency in a mobile communication system.

Technical Solution

One aspect of the present invention provides a method for generating a lower layer data block to be transmitted from a specific layer in a transmitting side to a receiving side in a mobile communication system.

To accomplish this, the method includes receiving an upper layer data block from an upper layer and generating a lower layer data block including at least part of the upper layer data block and a buffer status indicator indicating a status change of a data buffer associated with a group identifier corresponding to the upper layer data block.

One aspect of the present invention provides a data block structure transmitted from a specific layer in a transmitting side to a receiving side in a mobile communication system.

To accomplish this, the data block structure includes a first field including a buffer status indicator indicating a status change of a data buffer associated with a group identifier and at least part of an upper layer data block.

Advantageous Effects

The method for generating a data block in a mobile communication system according to the invention provides the following advantages.

First, various states of buffers carrying upper layer data blocks are transmitted to a base station.

Second, states of buffers carrying upper layer data blocks are transmitted to a base station using minimum radio resources, thereby increasing system efficiency.

MODE FOR INVENTION

Figure 1:
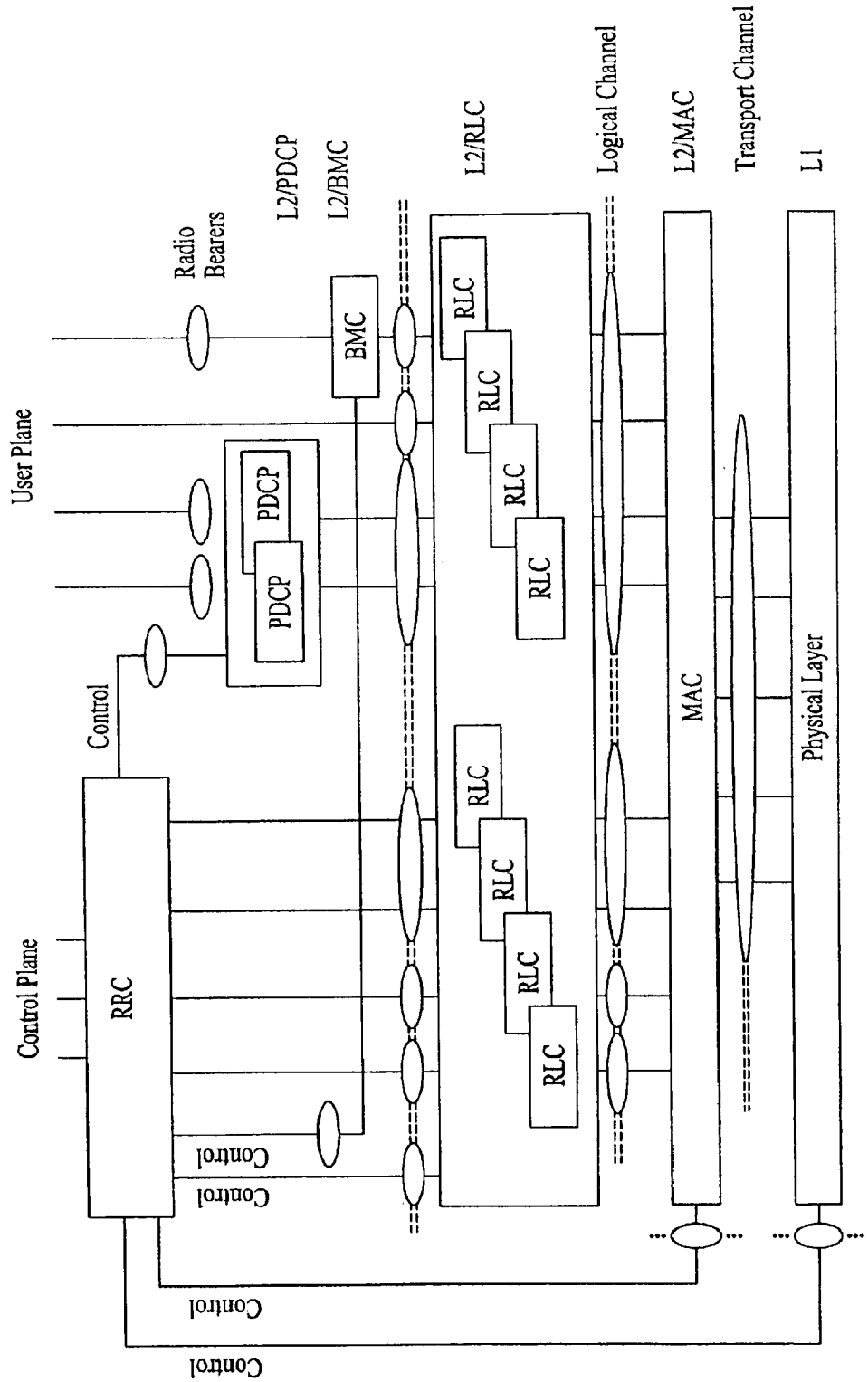
FIG. 1 illustrates the structure of a wireless access protocol responsible for data transmission in a radio link of a Universal Mobile Telecommunication System (UMTS) which is a third generation mobile communication system.

The above and other configurations, operations, and features of the present invention will be more easily understood from the embodiments of the invention described with reference to the accompanying drawings. The detailed description, which will be given below with reference to the accompanying drawings, is intended to explain exemplary embodiments of the present invention, rather than to show the only embodiments that can be implemented according to the invention. The embodiments described below are examples wherein the technical features of the invention are applied to an Evolved Universal Mobile Telecommunications System (E-UMTS) that is also referred to as a "Long Term Evolution (LTE) system." It is apparent that the technical features of the invention can also be applied to other similar mobile communication systems such as IEEE 802.16m or Wibro systems.

The E-UMTS system is an evolved version of the conventional WCDMA UMTS system and a basic standardization process thereof is in progress in the 3rd Generation Partnership Project (3GPP). For details of the technical specifications of UMTS and E-UMTS, see Release 7, Release 8, and Release 9 of "3rd Generation Partnership Project; Technical Specification Group Radio Access Network."

The technology described below can be used for various communication systems including a system using multiple antennas.

Communication systems are widely arranged to provide various communication services such as voice and packet data services. This technology can be used for downlink or uplink. The term "downlink" refers to communication from a base station to a terminal and "uplink" refers to communication from a terminal to a base station. The term "base station" generally refers to a fixed point that communicates with terminals and includes a network excluding terminals in a communication system including not only a physical transport end but also upper layers. Thus, in the invention, the network and base station are considered identical as they constitute the side opposite the terminals. Terminals may be fixed or mobile. The invention can be used in a single-carrier or multi-carrier communication system. The multi-carrier system can use Orthogonal Frequency Division Multiplexing (OFDM) or other multi-carrier modulation techniques.

An embodiment of the invention suggests a method for generating a data block of a lower layer below a specific layer, the data block including a Buffer Status Indicator (BSI) indicating a status or a status change of a buffer associated with at least one specific data service passage.

The data service passage includes a logical channel or a Radio Bearer (RB). The term "RB" refers to a service that the second layer provides for transmission of data between terminals and a network including a base station, which is a UTRAN in the E-UMTS, as described above. The logical channel is a type of data stream carrying a specific type of information as described above. One or more logical channels or RBs can be provided. Logical channels or RBs can be divided into groups, each including a specific number of one or more logical channels or RBs. That is, one group may include only one logical channel or RB.

Figure 3:
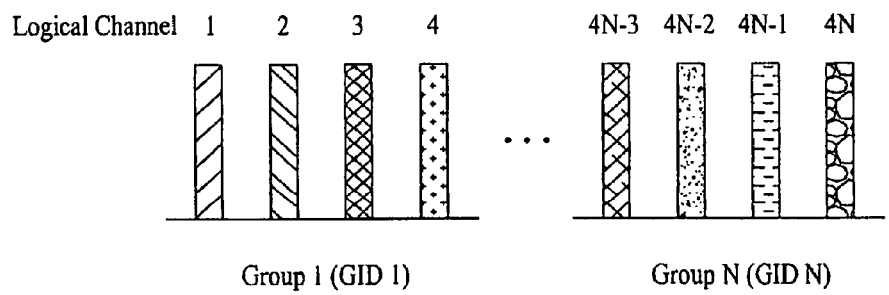
FIG. 3 illustrates grouping of one or more logical channels established between a base station and one or more terminals.

FIG. 3 illustrates grouping of one or more logical channels established between a base station and one or more terminals. As shown in FIG. 3, one group includes four logical channels. The number of logical channels belonging to one group can be set variably according to system environments. Not only logical channels but also RBs can be divided into groups. Groups can be defined using Group Identifiers (GIDs).

Logical channels in the same group may be or may not be logical channels allocated to the same terminal. One or more data buffers existed in a terminal store data blocks of an upper layer above the specific layer and transfers the upper layer data blocks to the specific layer according to the processing capacity of the specific layer. The upper layer data blocks are transferred through logical channels of a specific group.

However, even if the specific layer of the terminal has data for transmission in uplink, the terminal cannot transmit the uplink data if radio resources for transmission of the uplink data have not been allocated as described above. The terminal also needs to transmit its buffer status to the base station to allow the base station to allocate radio resources suitable for the amount of uplink data for transmission as described above.

Therefore, a buffer status indicator suggested in an embodiment of the invention indicates a status or a status change of a buffer associated with a specific group identifier.

The buffer status indicator may indicate whether or not data for uplink transmission by a terminal remains in a data buffer of the terminal associated with an RB or a logical channel belonging to a specific group identifier associated with the buffer status indicator.

The buffer status indicator may indicate whether or not the amount of data for uplink transmission by a terminal stored in a data buffer of the terminal associated with an RB or a logical channel belonging to a specific group identifier associated with the buffer status indicator has been increased by a predetermined amount.

The buffer status indicator may indicate whether or not the amount of data for uplink transmission by a terminal stored in a data buffer of the terminal associated with an RB or a logical channel belonging to a specific group identifier associated with the buffer status indicator has been decreased by a predetermined amount.

The buffer status indicator may indicate whether or not the amount of data for uplink transmission by a terminal stored in a data buffer of the terminal associated with an RB or a logical channel belonging to a specific group identifier associated with the buffer status indicator is less than a predetermined level.

The buffer status indicator may indicate whether or not the amount of data for uplink transmission by a terminal stored in a data buffer of the terminal associated with an RB or a logical channel belonging to a specific group identifier associated with the buffer status indicator is greater than a predetermined level.

The buffer status indicator may indicate whether or not the amount of data for uplink transmission by a terminal stored in a data buffer of the terminal associated with an RB or a logical channel belonging to a specific group identifier associated with the buffer status indicator is greater than the total amount of data that can be transmitted for a time specified based on the amount of currently allocated radio resources.

The buffer status indicator may indicate whether or not the amount of data for uplink transmission by a terminal stored in a data buffer of the terminal associated with an RB or a logical channel belonging to a specific group identifier associated with the buffer status indicator is greater than the total amount of data that can be transmitted for a time specified based on the amount of data of at least one of a logical channel, an RB, a logical channel group, and an RB group currently included in a PDU of a specific layer.

The buffer status indicator may indicate whether or not transmission is possible with power higher than the power required to transmit an upper layer data block associated with an RB or a logical channel belonging to a specific group identifier associated with the buffer status indicator.

The specific layer suggested in an embodiment of the invention is a Medium Access Control (MAC) layer and the lower layer data block is a MAC PDU.

The buffer status indicator suggested in an embodiment of the invention may be included in a MAC PDU.

The buffer status indicator suggested in an embodiment of the invention may be included in a header of a MAC PDU.

The buffer status indicator suggested in an embodiment of the invention may be included in a subheader corresponding to a specific upper layer data block in a MAC PDU.

The buffer status indicator suggested in an embodiment of the invention may be included in each MAC PDU, wherein the number of bits of the buffer status indicator included in each MAC PDU is specified taking into consideration all logical channels or RBs corresponding to the MAC PDU.

The buffer status indicator suggested in an embodiment of the invention may be included in a MAC PDU such that the buffer status indicator having a specified number of bits is included for every logical channel carrying upper layer data blocks included in the MAC PDU.

The buffer status indicator suggested in an embodiment of the invention may be included in a MAC PDU such that the buffer status indicator having a specified number of bits is included for every RB carrying upper layer data blocks included in the MAC PDU.

The buffer status indicator suggested in an embodiment of the invention may be included in a MAC PDU such that the buffer status indicator having a specified number of bits is included for every logical channel group included in the MAC PDU.

The buffer status indicator suggested in an embodiment of the invention may be included in a MAC PDU such that the buffer status indicator having a specified number of bits is included for every RB group included in the MAC PDU.

The buffer status indicator suggested in an embodiment of the invention may be included in a MAC PDU such that the buffer status indicator having a specified number of bits is included for every logical channel group set for a terminal.

The buffer status indicator suggested in an embodiment of the invention may be included in a MAC PDU such that the buffer status indicator having a specified number of bits is included for every RB group set for a terminal.

In a method for generating a lower layer data block including the buffer status indicator suggested in an embodiment of the invention, a buffer status indicator associated with only a data buffer containing an upper layer data block for actual transmission among data buffers associated with a logical channel group or an RB group may be included in a MAC PDU.

The number of bits used to indicate the buffer status indicator suggested in an embodiment of the invention may be different for each RB or each logical channel group.

Information indicating a buffer whose status or status change is to be checked using the buffer status indicator suggested in an embodiment of the invention and the number of one or more bits used to indicate the buffer status indicator for each RB or each logical channel group may be provided to a terminal through system information of a base station or through a request made by the terminal.

A lower layer data block including the buffer status indicator may be transmitted to a base station upon at least one of a call establishment process, a call communication process, and a request made by the base station.

A base station may transmit radio resource allocation information to a terminal in response to a buffer status indicator transmitted from the terminal and the terminal may perform uplink transmission to the base station using the radio resource allocation information.

Figure 2:
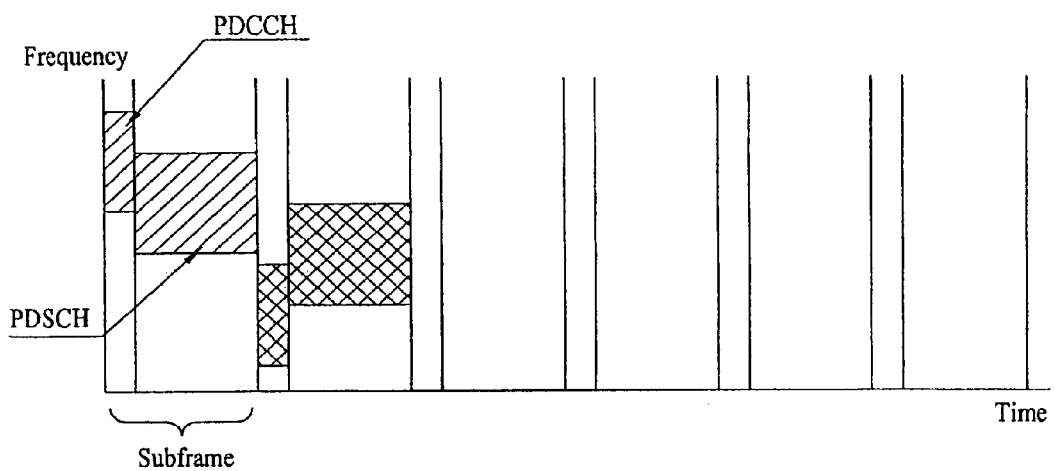
FIG. 2 illustrates a method in which a terminal receives data in an E-UMTS system.
Figure 4:
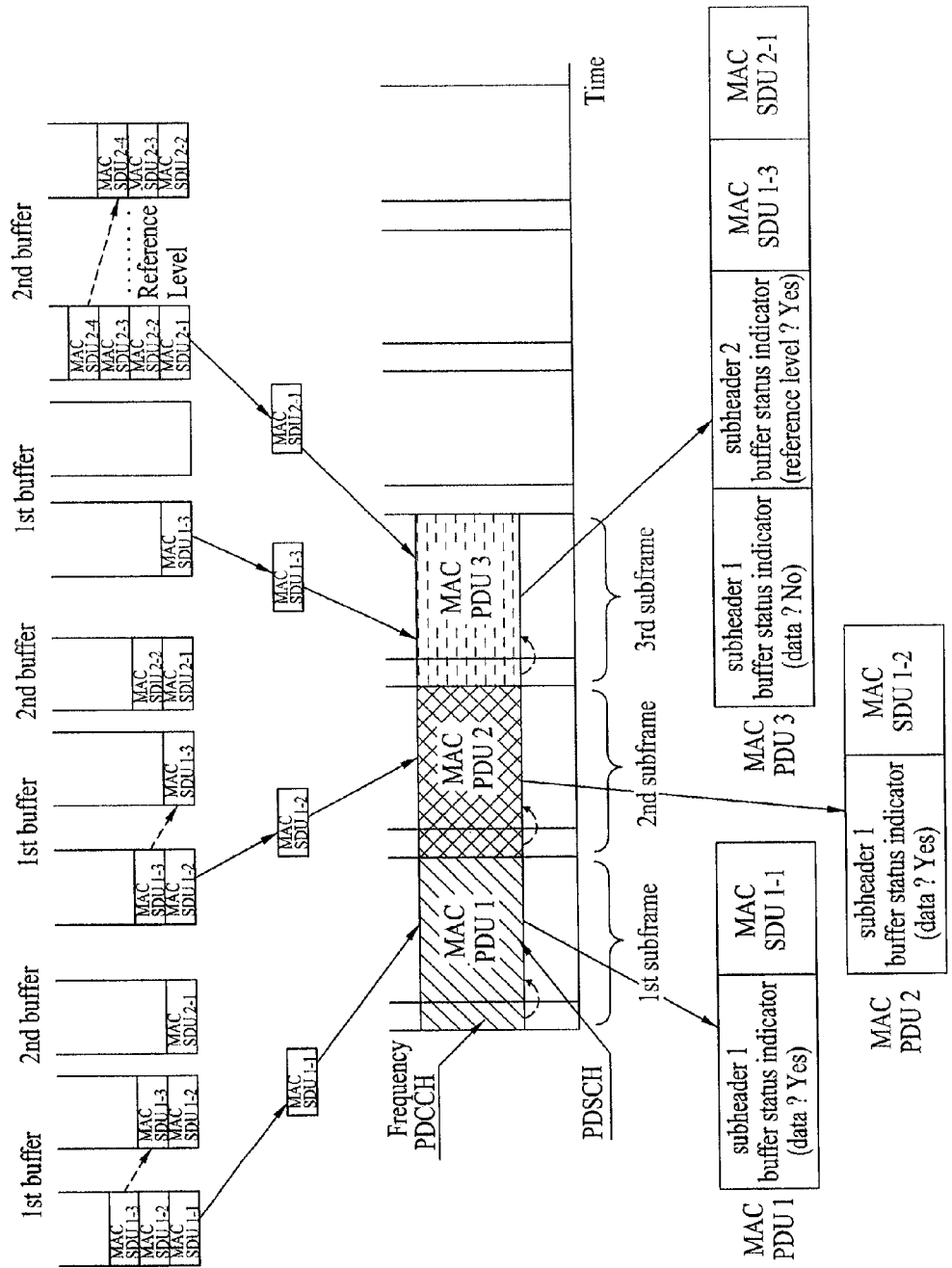
FIG. 4 illustrates transmission of a data block including a buffer status indicator suggested in another embodiment of the invention.

FIG. 4 illustrates transmission of a lower layer data block including a buffer status indicator suggested in another embodiment of the invention. Specifically, FIG. 4 illustrates a method for transmitting a data block including a buffer status indicator in the OFDM system as described above in FIG. 2.

In a method for generating a lower layer data block including the buffer status indicator suggested in another embodiment of the invention, a 1-bit buffer status indicator associated with only a data buffer containing an upper layer data block for actual transmission among data buffers associated with a logical channel group or an RB group is included in a MAC PDU (the buffer status indicator is "1" when the requirement that the data buffer contains an upper layer data block for actual transmission is satisfied and "0" when the requirement is not satisfied).

In a method for generating a lower layer data block including the buffer status indicator suggested in another embodiment of the invention, two data buffers associated with a logical channel group including one logical channel are provided in a terminal and a buffer status indicator of the first of the two buffers indicates whether or not any upper layer data block remains in the first buffer and a buffer status indicator of the second buffer indicates whether or not the number of upper layer data blocks in the second buffer is greater than a predetermined reference number.

The buffer status indicator is included in a subheader corresponding to the upper layer data block.

Since upper layer data blocks are present in a data buffer belonging to a first logical channel group (GID 1) among two logical channel groups in a MAC PDU belonging to a PDSCH of a first subframe period, a buffer status indicator in a corresponding subheader 1 is set to indicate that upper layer data blocks (MAC SDU 1-1 and MAC SDU 1-2) are present.

However, a subheader 2 including a buffer status indicator is not included in a MAC PDU since no upper layer data block is received from a data buffer belonging to a second logical channel group (GID 2).

Therefore, upon receiving the status indication information, the base station allocates radio resources for the GID 1 and does not allocate radio resources for the GID 2.

Since an upper layer data block is present in a data buffer belonging to a first logical channel group (GID 1) among two logical channel groups in a MAC PDU belonging to a PDSCH of a second subframe period, a buffer status indicator in a corresponding subheader 1 is set to indicate that an upper layer data block (MAC SDU 1-3) is present.

However, a subheader 2 including a buffer status indicator is not included in a MAC PDU since no upper layer data block is received from a data buffer belonging to a second logical channel group (GID 2).

Therefore, upon receiving the status indication information, the base station allocates radio resources for the GID 1 and does not allocate radio resources for the GID 2.

Since no upper layer data block is present in a data buffer belonging to a first logical channel group (GID 1) among two logical channel groups in a MAC PDU belonging to a PDSCH of a third subframe period (i.e., since upper layer data corresponding to GID 1 is no longer present in the buffer although the last, third upper layer data block is transferred to the MAC PDU), a buffer status indicator in a corresponding subheader 1 is set to indicate that no data is present.

However, a buffer status indicator is included in a subheader of an upper layer data block belonging to a second logical channel group (GID 2) since a number of upper layer data blocks equal to or greater than a predetermined reference number are stored in a data buffer belonging to the GID 2 (specifically, three or more upper layer data blocks are stored in the second buffer, for example) and one of the upper layer data blocks is received and included in the MAC PDU.

Therefore, upon receiving the status indication information, the base station does not allocate radio resources for the GID 1 but rather allocates an amount of radio resources corresponding to at least one upper layer data block or corresponding to the predetermined reference number for the GID 2.

Figure 5:
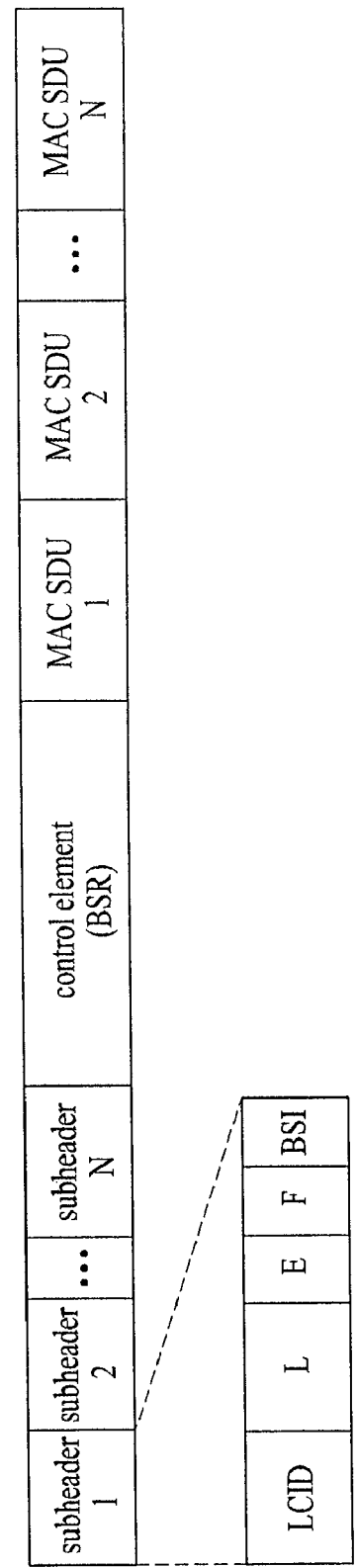
FIG. 5 illustrates a data block structure including a buffer status indicator suggested in another embodiment of the invention.

FIG. 5 illustrates a data buffer structure including a buffer status indicator suggested in another embodiment of the invention. The data buffer structure of FIG. 5 is a MAC PDU structure.

A MAC PDU includes one or more MAC SDUs corresponding to upper layer data blocks and a MAC header which is a set of MAC subheaders indicating the size or type of each MAC SDU. A MAC subheader includes a Logical Channel ID (LCID) identifying each SDU, a length field (L) indicating the size of each SDU, and an extension field (E) indicating whether a subsequent field is a MAC header or an SDU to indicate whether or not additional headers are present. The MAC subheader also includes a format field (F) indicating the size of the length field. The LCID field indicates which logical channel corresponds to data of a MAC SDU which is an upper layer data block associated with a subheader including the LCID. That is, one MAC PDU includes one or more upper layer data blocks and different logical channels can be allocated to the upper layer data blocks individually.

The Buffer Status Indicator (BSI) field suggested in another embodiment of the invention may be included in the corresponding subheader. The buffer status indicator suggested in another embodiment of the invention may be included in a buffer status report control element of the MAC PDU.

The buffer status report control element includes the size of one or more buffers and the same number of logical channel group identifiers as the number of buffers.

The logical channel group identifier indicates a logical channel group to which a logical channel carrying the upper layer data block belongs and the buffer size indicates the total amount of data available through all logical channels of logical channel groups belonging to the MAC PDU.

While the above embodiments of the present invention have been described focusing on the data communication relationship between transmitting and receiving sides for ease of explanation, the transmitting side may be a terminal or a base station in a network and the receiving side may be a base station in a network or a terminal. The terms used in the present disclosure can be replaced with other terms having the same meanings. For example, the term "terminal" may be replaced with another term such as "mobile station," "mobile terminal," "communication terminal," "user equipment (UE)," or "user device" and the term "base station" may be replaced with another term such as "fixed station," "Node B (NB)," or "eNode B (eNB)."

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be applied to a communication system, and more particularly to a method for generating data blocks in a mobile communication system.

The invention claimed is:

1. A method for generating a lower layer data block to be transmitted from a specific layer in a transmitting side to a receiving side in a mobile communication system, the method comprising:

receiving an upper layer data block from an upper layer; and generating a lower layer data block including at least part of the upper layer data block and a buffer status indicator indicating a status of a data buffer associated with a group identifier corresponding to the upper layer data block, wherein the group identifier indicates a group including a plurality of data service passages, wherein the buffer status indicator indicates whether or not the amount of data stored in the data buffer is greater than the total amount of data that can be transmitted for a time specified based on the amount of currently allocated radio resources, wherein the number of bits used to indicate the buffer status indicator is different for each group, and wherein the number of bits used to indicate the buffer status indicator is provided through system information.

2. The method according to claim 1, wherein the upper layer data block is received from the data buffer.

3. The method according to claim 1, wherein the buffer status indicator is included in a subheader corresponding to the upper layer data block.

* * * * *